(12) United States Patent
Deshpande et al.

(10) Patent No.: US 11,227,624 B2
(45) Date of Patent: Jan. 18, 2022

(54) METHOD AND SYSTEM USING SUCCESSIVE DIFFERENCES OF SPEECH SIGNALS FOR EMOTION IDENTIFICATION

(71) Applicant: Tata Consultancy Services Limited, Mumbai (IN)

(72) Inventors: Gauri Ashutosh Deshpande, Pune (IN); Sachin Patel, Pune (IN); Mayuri Duggirala, Pune (IN); Venkata Subramanian Viraraghavan, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 204 days.

(21) Appl. No.: 16/812,757

(22) Filed: Mar. 9, 2020

(65) Prior Publication Data

US 2020/0286506 A1 Sep. 10, 2020

(30) Foreign Application Priority Data

Mar. 8, 2019 (IN) .............................. 201921009121

(51) Int. Cl.
| | | |
|---|---|---|
| *G10L 15/00* | (2013.01) | |
| *G10L 25/63* | (2013.01) | |
| *G10L 15/02* | (2006.01) | |
| *G10L 15/06* | (2013.01) | |
| *G10L 15/22* | (2006.01) | |
| *G10L 15/07* | (2013.01) | |
| *G10L 15/20* | (2006.01) | |

(52) U.S. Cl.
CPC .............. *G10L 25/63* (2013.01); *G10L 15/02* (2013.01); *G10L 15/063* (2013.01); *G10L 15/22* (2013.01); *G10L 15/07* (2013.01); *G10L 15/20* (2013.01)

(58) Field of Classification Search
CPC combination set(s) only.
See application file for complete search history.

(56) References Cited

U.S. PATENT DOCUMENTS

| 6,151,571 A | 11/2000 | Pertrushin |
|---|---|---|
| 2008/0040110 A1 | 2/2008 | Pereg et al. |

*Primary Examiner* — Vu B Hang
(74) *Attorney, Agent, or Firm* — Finnegan, Henderson, Farabow, Garrett & Dunner LLP

(57) ABSTRACT

This disclosure relates generally to speech signal processing, and more particularly to a method and system for processing speech signal for emotion identification. The system processes a speech signal collected as input, during which a plurality of differential features corresponding to a plurality of frames of the speech signal are extracted. Further, the differential features are compared with an emotion recognition model to identify at least one emotion matching the speech signal, and then the at least one emotion is associated with the speech signal.

12 Claims, 4 Drawing Sheets

METHOD AND SYSTEM USING SUCCESSIVE DIFFERENCES OF SPEECH SIGNALS FOR EMOTION IDENTIFICATION

PRIORITY CLAIM

This U.S. patent application claims priority under 35 U.S.C. § 119 to: India Application No. 201921009121, filed on Mar. 8, 2019. The entire contents of the aforementioned application are incorporated herein by reference.

TECHNICAL FIELD

This disclosure relates generally to speech signal processing, and more particularly to a method and system for processing speech signal for emotion identification.

BACKGROUND

Typically, when different users communicate to each other different emotions are conveyed through the speech signals. For example, when a user informs a happy news to another user, the emotion 'happiness' is conveyed through their speech signal. Similarly when two users are involved in a long conversation covering multiple topics, depending on nature of the topic being discussed, different emotions may be conveyed, which means within the same communication session, speech signals conveying different emotions are exchanged between the users involved in the communication.

The inventors here have recognized several technical problems with such conventional systems, as explained below. Speech signal processing allows identification of emotions associated with a speech signal. Different mechanisms exist which allow identification of the emotions. However, accuracy with which the existing mechanisms identify the emotions associated with the speech signals being processed varies from one approach to another.

SUMMARY

Embodiments of the present disclosure present technological improvements as solutions to one or more of the above-mentioned technical problems recognized by the inventors in conventional systems. For example, in one embodiment, a processor-implemented method of speech signal processing is provided. In this method, initially a speech signal from at least one user is collected as input, via one or more hardware processors. Further, a plurality of features from the speech signal are extracted to generate a feature file, via the one or more hardware processors. Extraction of the plurality of features involves: sampling the speech signal at a defined sampling rate to generate a plurality of sampled speech signals; splitting each of the plurality of sampled speech signals to a plurality of overlapping or non-overlapping frames of 20 milliseconds length; extracting a plurality of differential features from each of the plurality of frames; extracting the plurality of features from the differential features of the plurality of overlapping or non-overlapping frames, via the one or more hardware processors; comparing each of the differential features with an emotion recognition model to identify at least one emotion corresponding to the speech signal, via the one or more hardware processors; and associating with the speech signal the at least one emotion identified, via the one or more hardware processors. The differential features for each of the plurality of frames are extracted by executing the following steps for each frame: selecting one sample in every M samples of the speech signal in the frame, where M is 2; and calculating differences between adjacent samples of the frame as a differential feature to get an output frame of size (L−(N)), where L is the number of samples in a frame divided by M, and N represents number of times the difference between adjacent values is calculated.

In another embodiment, a system of speech signal processing is provided. The system includes a memory module storing a plurality of instructions; one or more communication interfaces; and one or more hardware processors coupled to the memory module via the one or more communication interfaces. The one or more hardware processors are caused by the plurality of instructions to initially collect a speech signal from at least one user as input. Further, a plurality of features from the speech signal are extracted to generate a feature file. Extraction of the plurality of features involve: sampling the speech signal at a defined sampling rate to generate a plurality of sampled speech signals; splitting each of the plurality of sampled speech signals to a plurality of overlapping or non-overlapping frames of 20 milliseconds length; extracting a plurality of differential features from each of the plurality of frames; extracting the plurality of features from the differential features of the plurality of overlapping or non-overlapping frames; comparing each of the differential features with an emotion recognition model to identify at least one emotion corresponding to the speech signal; and associating the identified at least one emotion with the speech signal. The differential features for each of the plurality of frames are extracted by executing the following steps for each frame: selecting one sample in every M samples of the speech signal in the frame, where M is 2; and calculating differences between adjacent samples of the frame as a differential feature to get an output frame of size (L−(N)), where L is the number of samples in a frame divided by M, and N represents the number of times the difference between adjacent values is calculated.

In yet another embodiment, a non-transitory computer readable medium for speech signal processing is provided. The non-transitory computer readable medium executes the following method during the speech signal processing. In this method, initially a speech signal from at least one user is collected as input, via one or more hardware processors. Further, a plurality of features from the speech signal are extracted to generate a feature file, via the one or more hardware processors. Extraction of the plurality of features involve: sampling the speech signal at a defined sampling rate to generate a plurality of sampled speech signals; splitting each of the plurality of sampled speech signals to a plurality of overlapping or non-overlapping frames of 20 milliseconds length; extracting a plurality of differential features from each of the plurality of frames; extracting the plurality of features from the differential features of the plurality of overlapping or non-overlapping frames, via the one or more hardware processors; comparing each of the differential features with an emotion recognition model to identify at least one emotion corresponding to the speech signal, via the one or more hardware processors; and associating the identified at least one emotion with the speech signal, via the one or more hardware processors. The differential features for each of the plurality of frames are extracted by executing the following steps for each frame: selecting one sample in every M samples of the speech signal in the frame, where M is 2; and calculating differences between adjacent samples of the frame as a differential feature to get an output frame of (L−(N)), where L is the number of samples in a frame divided by M, and N represents the number of times the difference between adjacent values is calculated.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
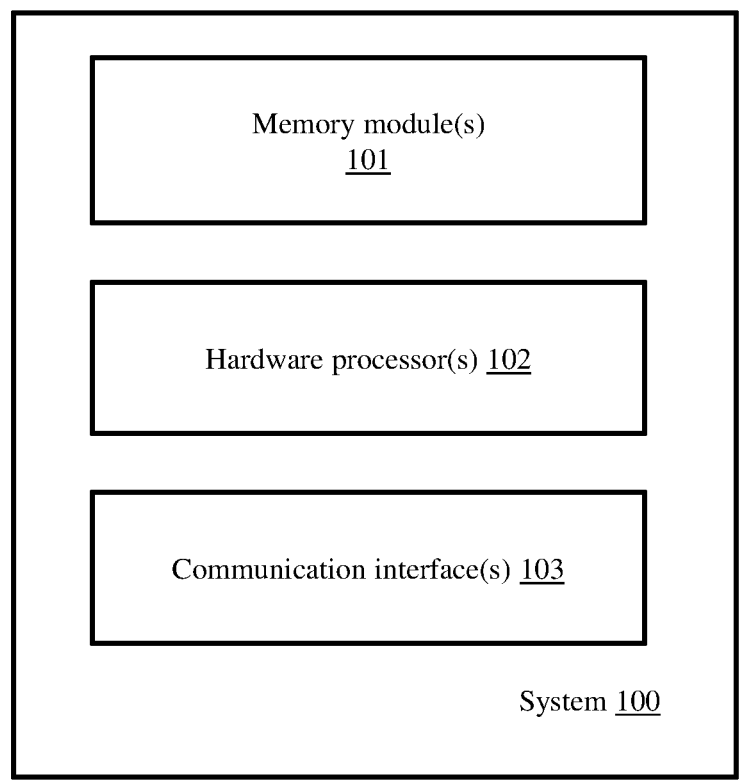
FIG. 1 illustrates an exemplary block diagram of a system used for speech signal processing, according to some embodiments of the present disclosure.

FIG. 1 illustrates an exemplary block diagram of a system used for speech signal processing, according to some embodiments of the present disclosure. The system 100 includes at least one memory module 101, at least one hardware processor 102, and at least one communication interface 103.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the hardware processor(s) 102 are configured to fetch and execute computer-readable instructions stored in the memory module 101, which causes the hardware processor(s) 102 to perform actions depicted in FIG. 2 and FIG. 3 for the purpose of performing speech processing for emotion identification. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory module(s) 101 stores a plurality of instructions which when executed, cause the one or more hardware processors 102 to perform the speech signal processing for emotion identification.

The system 100 can be implemented in such a way that it can collect real-time speech input from at least one user and process the collected speech signal for the emotion identification purpose. In an example mode of implementation, the system 100 may be a component of a communication device being used by the at least one user. In another possible mode of implementation, the system 100 is part of a communication network, and one or more user communications may be routed through the system 100.

Figure 4A:
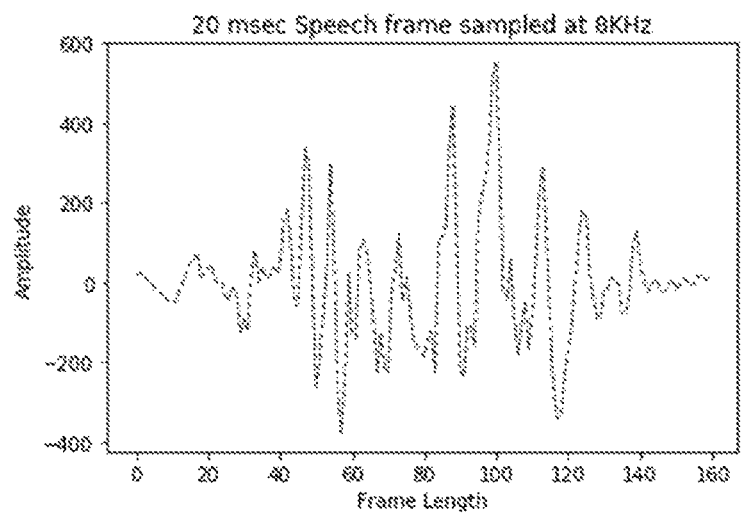
FIGS. 4a and 4b are example diagrams depicting signals at different stages of processing by the system of FIG. 1, according to some embodiments of the present disclosure.

The system 100 processes the speech signal collected as input, and extracts a plurality of features from the speech signal. The system 100 may use any suitable mechanism/techniques for extracting the plurality of frames from the speech signal. The system 100 then processes the frames and extracts one or more differential features. The process of extracting the differential features is explained below:

During this process the speech signal corresponding to each of the extracted features is sampled at a defined sampling rate. For example, the sampling rate may be 8000 Hz (this is depicted in FIG. 4a). In an embodiment, if the original sampling is not carried out at the defined sampling rate, a samples corresponding to the defined sampling rate are generated from the original samples. Each of the sampling outputs i.e. sampled speech signals is then split to a plurality of overlapping or non-overlapping frames, each of length 20 ms. Further each frame is separately processed by the system 100. During the processing of each of the frames, the system 100 selects one sample in every M samples of the speech signal in the frame. In various embodiments, the selection of the one sample from every M samples may be at random or may be based on any specific pre-defined conditions that may have been configured with the system 100. For example, the pre-defined condition may be in terms of intervals within which the samples need to be picked. The system 100 may be configured to pick the first of each M samples and skip M−1 samples, and then pick the first sample of the next M samples, and so on. Further the system 100 generates the differential values of the speech signal by calculating differences between adjacent samples of the frame to get an output frame of size (L−(N)).

Figure 3:
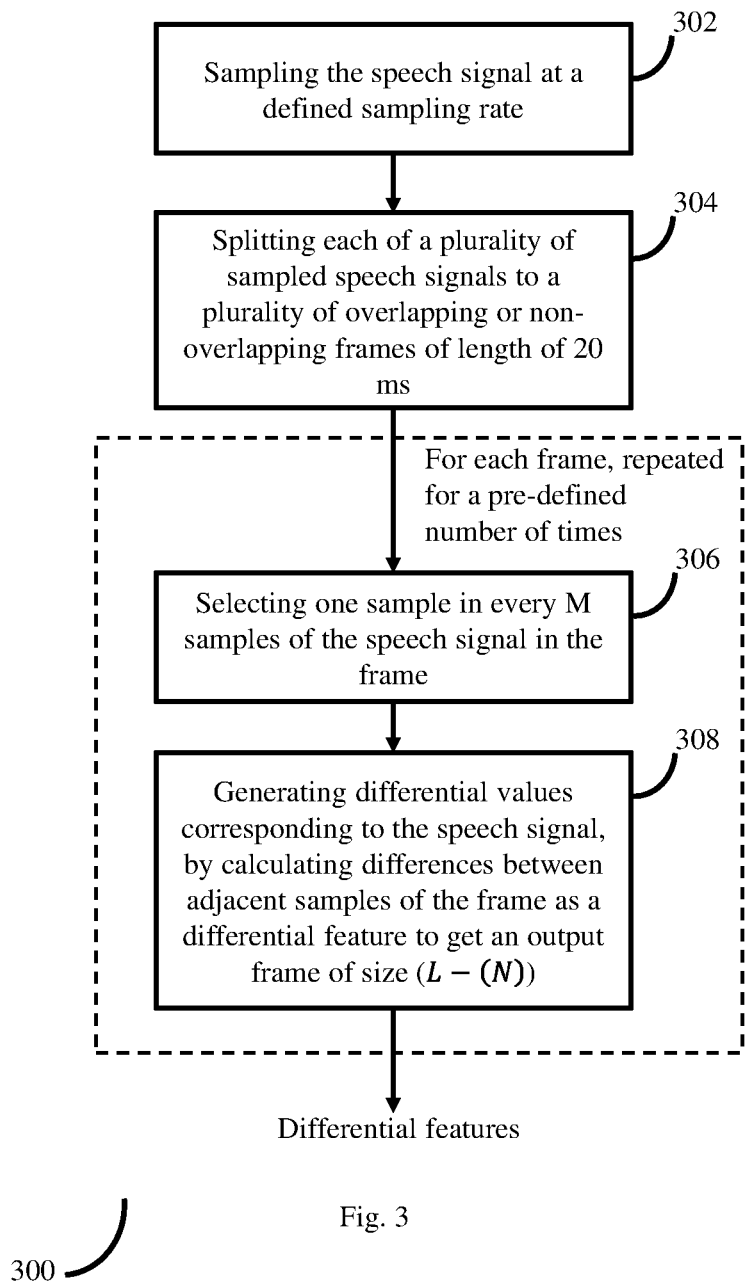
FIG. 3 is a flow diagram depicting steps involved in the process of extracting differential values corresponding to a speech signal, using the system of FIG. 1, according to some embodiments of the present disclosure.
Figure 4B:
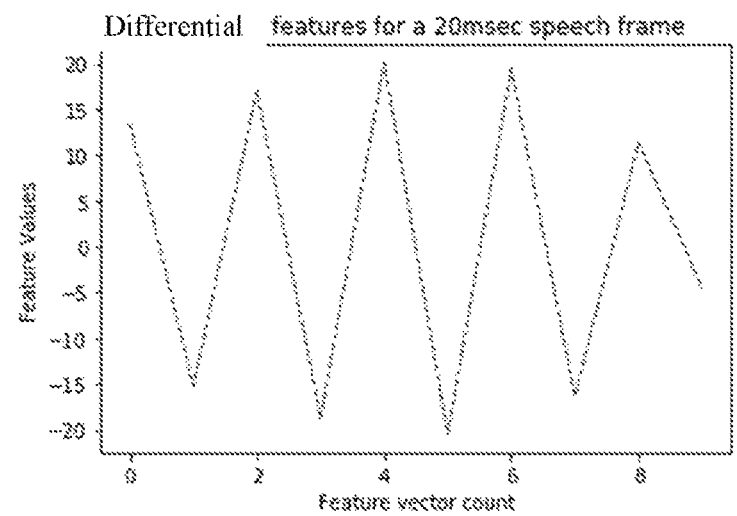

The system then extracts a plurality of features from the differential values (as depicted in FIG. 4b), and then compares the extracted plurality of differential values with an emotion recognition model to identify at least one emotion that matches the speech signal. The emotion recognition model is a reference database that stores at least the information pertaining to mapping between different differential values and corresponding emotions. By identifying match for the differential values of the speech signal in the emotion recognition model, the system 100 identifies corresponding emotions as the emotions matching the speech signal. The system 100 may then associate each of the identified emotions with the speech signal. This process is elaborated in FIG. 2 as well as in FIG. 3.

The emotion recognition model may be a data model generated using suitable machine learning algorithms. Inputs for the machine learning model(s) for generating the emotion recognition model may be speech signals, sentences extracted from the speech signal, utterances extracted from the sentences and so on.

Figure 2:
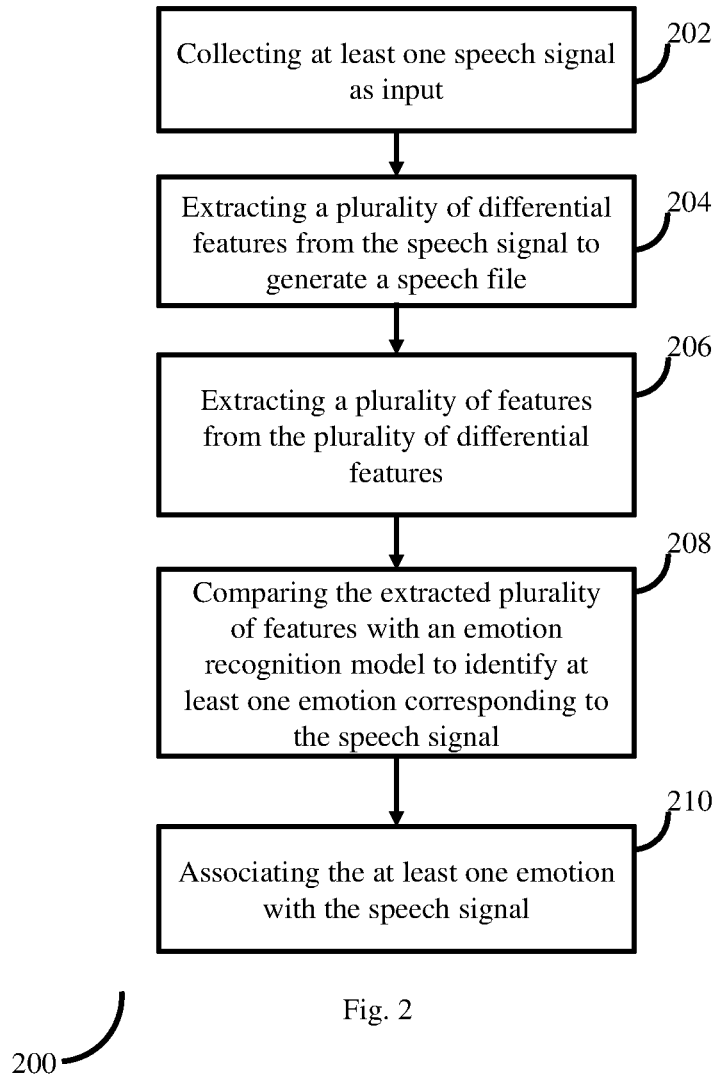
FIG. 2 is a flow diagram depicting steps involved in the process of emotion identification using the system of FIG. 1, according to some embodiments of the present disclosure.

FIG. 2 is a flow diagram depicting steps involved in the process of emotion identification using the system of FIG. 1, according to some embodiments of the present disclosure. In this method, at least one speech signal is collected (202) as input by the system 100, via one or more hardware processors. Then the collected speech signal is processed, via the one or more hardware processors, during which a plurality of differential features are extracted (204) by the system 100 using the method 300. Out of the plurality of differential features, the system 100 extracts (206) a plurality of features, which are then compared (208) with an emotion recognition model, via the one or more hardware processors. Based on matching data found in the emotion recognition model, the system 100 identifies at least one emotion as matching the collected speech signal, and then associates (210) the identified at least one emotion with the speech signal, via the one or more hardware processors. In an embodiment, the system 100 associates the emotions to the speech signal such that emotions that match each frame of the speech signal is associated with the corresponding frame. For example, consider a speech signal of length 20 seconds. Consider that the system 100 identifies that the emotion that matches the first 10 seconds (i.e. 0-10 sec) is HAPPY, and for speech signal from 11 to 20 sec, the emotion is SAD, then the system 100 accordingly associates the emotions to the speech signal and presents in an appropriate format to the user.

FIG. 3 is a flow diagram depicting steps involved in the process of extracting differential values corresponding to a speech signal, using the system of FIG. 1, according to some embodiments of the present disclosure. In this process, the system 100 samples (302) the speech signal at a defined sampling rate. For example, the sampling rate is 8000 Hz. Output of the sampling process is a plurality of sampled speech signals. The system 100 then splits (304) each of the plurality of sampled speech signals to a plurality of overlapping and non-overlapping frames, each of length 20 ms. Further the system 100 separately processes each of the plurality of frames. Steps involved in the process of processing each frame is explained below.

The system 100 selects (306) one sample in every M samples of the speech signal in a frame being considered. In various embodiments, the system 100 may randomly select one out of M samples or may select the sample based on at least one defined condition. The system 100 then generates differential values corresponding to the speech signal, by calculating differences between adjacent samples of the frame as a differential feature to get an output frame of size (L−(N)). By iterating the steps 306 and 308 for a pre-defined number of times, for each frame, the system 100 generates a plurality of differential features corresponding to the speech signal being processed by the system 100.

It is to be noted that though the mechanism of generating the differential features (as in method 300) is explained in context of speech signal processing, the same method can be used for processing other types (other than the speech signal) of signals as well, in different signal processing domains.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of speech signal processing, comprising:
    collecting a speech signal from at least one user, as input, via one or more hardware processors;
    extracting a plurality of differential features from the speech signal to generate a feature file, via the one or more hardware processors, by:
        sampling the speech signal at a defined sampling rate to generate a plurality of sampled speech signals;
        splitting each of the plurality of sampled speech signals to a plurality of overlapping or non-overlapping frames of 20 milliseconds length;
        iteratively performing for each of the plurality of frames, for a pre-defined number of times:
            selecting one sample in every M samples of the speech signal in the frame, where M is 2; and
            calculating differences between adjacent samples of the frame as the differential feature to get an output frame of size (L−(N)), where L is number of samples in a frame divided by M, and N represents number of times the difference between adjacent values is calculated;

extracting the plurality of features from the plurality of differential features of the plurality of overlapping or non-overlapping frames, via the one or more hardware processors;

comparing each of the differential features with an emotion recognition model to identify at least one emotion corresponding to the speech signal, via the one or more hardware processors;

associating the identified at least one emotion with the speech signal, via the one or more hardware processors; and outputting the association in a particular format.

2. The method as claimed in claim 1, wherein the emotion recognition model comprises of information pertaining to a plurality of speech signal characteristics and corresponding emotions, annotated at an utterance level.

3. The method as claimed in claim 1, wherein identifying the at least one emotion corresponding to the speech signal comprises:
identifying matching data in the emotion recognition model, corresponding to each of the plurality of features in the feature file; and
identifying at least one emotion tagged against each of the identified matching data in the emotion recognition model.

4. The method as claimed in claim 1, wherein the emotion recognition model is machine learning model generated by using training data comprising a plurality of sentences from at least one speech signal, and a plurality of utterances corresponding each of the plurality of sentences.

5. A system of speech signal processing, comprising:
a memory module storing a plurality of instructions;
one or more communication interfaces; and
one or more hardware processors coupled to the memory module via the one or more communication interfaces, wherein the one or more hardware processors are caused by the plurality of instructions to:
collect a speech signal from at least one user, as input;
extract a plurality of differential features from the speech signal to generate a feature file, by:
sampling the speech signal at a defined sampling rate to generate a plurality of sampled speech signals;
splitting each of the plurality of sampled speech signals to a plurality of overlapping or non-overlapping frames of 20 milliseconds length;
iteratively performing for each of the plurality of frames, for a pre-defined number of times:
selecting one sample in every M samples of the speech signal in the frame, where M is 2; and
calculating differences between adjacent samples of the frame as the differential feature to get an output frame of size (L−(N)), where L is number of samples in a frame divided by M, and N represents number of times the difference between adjacent values is calculated;
extract the plurality of features from the plurality of differential features of the plurality of overlapping or non-overlapping frames;
compare each of the differential features with an emotion recognition model to identify at least one emotion corresponding to the speech signal;
associate the identified at least one emotion with the speech signal; and
output the association in a particular format.

6. The system as claimed in claim 5, wherein the emotion recognition model comprises of information pertaining to a plurality of speech signal characteristics and corresponding emotions, annotated at an utterance level.

7. The system as claimed in claim 5, wherein the system identifies the at least one emotion corresponding to the speech signal by:
identifying matching data in the emotion recognition model, corresponding to each of the plurality of features in the feature file; and
identifying at least one emotion tagged against each of the identified matching data in the emotion recognition mode.

8. The system as claimed in claim 5, wherein the system generates the emotion recognition model by using training data comprising a plurality of sentences from at least one speech signal, and a plurality of utterances corresponding each of the plurality of sentences.

9. A non-transitory computer readable medium for speech signal processing, the non-transitory computer readable medium performs the speech signal processing by:
collecting a speech signal from at least one user, as input, via one or more hardware processors;
extracting a plurality of differential features from the speech signal to generate a feature file, via the one or more hardware processors, by:
sampling the speech signal at a defined sampling rate to generate a plurality of sampled speech signals;
splitting each of the plurality of sampled speech signals to a plurality of overlapping or non-overlapping frames of 20 milliseconds length;
iteratively performing for each of the plurality of frames, for a pre-defined number of times:
selecting one sample in every M samples of the speech signal in the frame, where M is 2; and
calculating differences between adjacent samples of the frame as the differential feature to get an output frame of size (L−(N)), where L is number of samples in a frame divided by M, and N represents number of times the difference between adjacent values is calculated;
extracting the plurality of features from the plurality of differential features of the plurality of overlapping or non-overlapping frames, via the one or more hardware processors;
comparing each of the differential features with an emotion recognition model to identify at least one emotion corresponding to the speech signal, via the one or more hardware processors;
associating the identified at least one emotion with the speech signal, via the one or more hardware processors; and
outputting the association in a particular format.

10. The non-transitory computer readable medium as claimed in claim 9, wherein the emotion recognition model comprises of information pertaining to a plurality of speech signal characteristics and corresponding emotions, annotated at an utterance level.

11. The non-transitory computer readable medium as claimed in claim 9, wherein identifying the at least one emotion corresponding to the speech signal comprises:
identifying matching data in the emotion recognition model, corresponding to each of the plurality of features in the feature file; and
identifying at least one emotion tagged against each of the identified matching data in the emotion recognition model.

12. The non-transitory computer readable medium as claimed in claim 9, wherein the emotion recognition model is machine learning model generated by using training data comprising a plurality of sentences from at least one speech signal, and a plurality of utterances corresponding each of the plurality of sentences.

\* \* \* \* \*